C. H. TORLEY.
FILTER.
APPLICATION FILED MAY 14, 1919.

1,408,785.

Patented Mar. 7, 1922.

WITNESSES:

INVENTOR:
CHARLES H. TORLEY.
ATTORNEY.

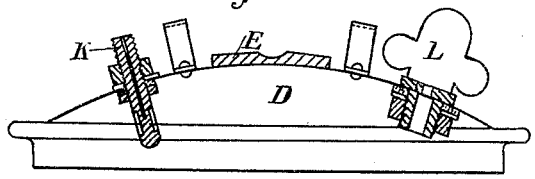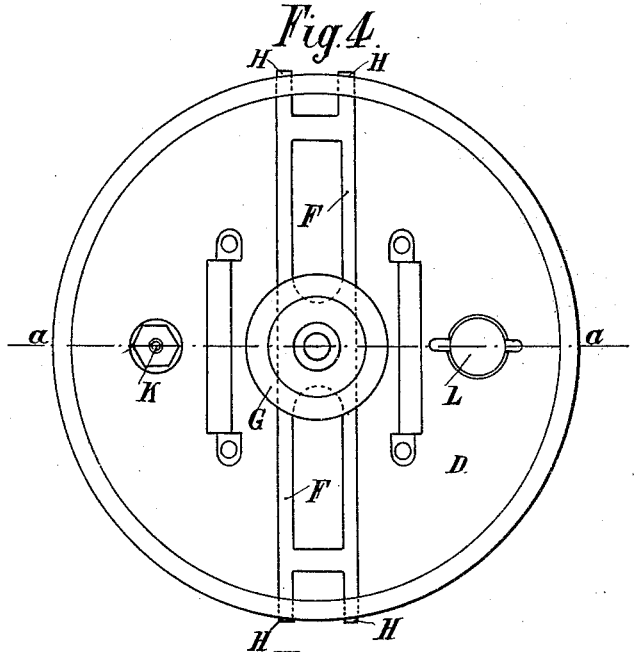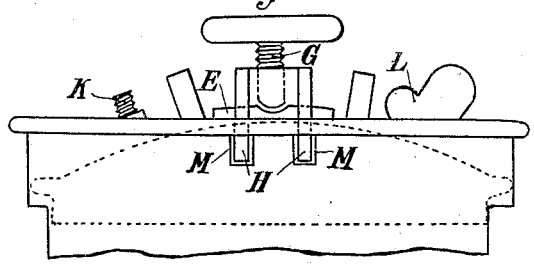

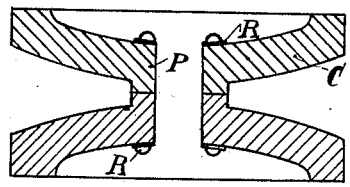
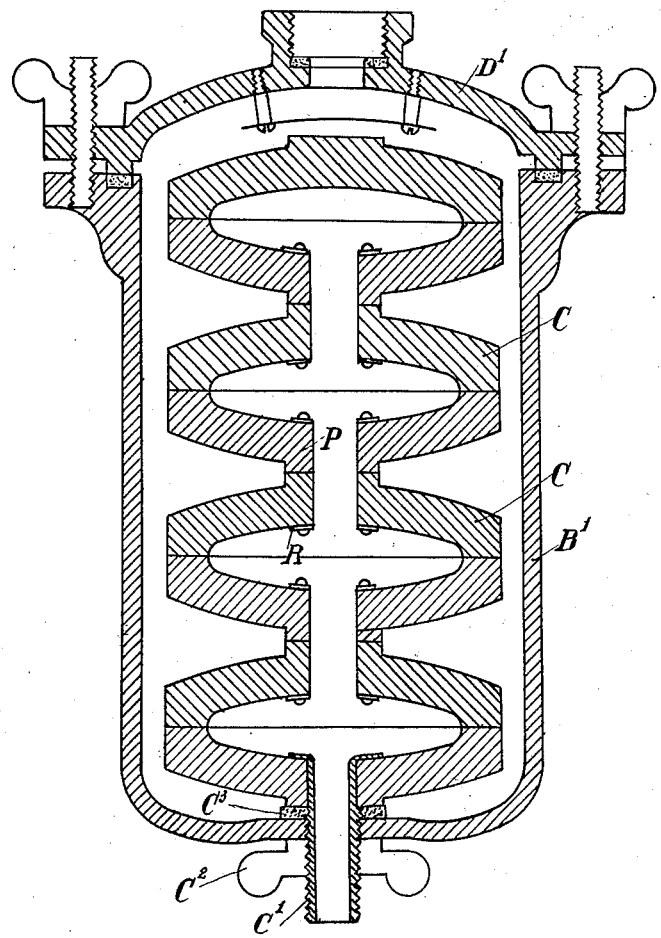

UNITED STATES PATENT OFFICE.

CHARLES HENRI TORLEY, OF BRUSSELS, BELGIUM.

FILTER.

1,408,785. Specification of Letters Patent. Patented Mar. 7, 1922.

Application filed May 14, 1919. Serial No. 297,110.

*To all whom it may concern:*

Be it known that I, CHARLES HENRI TORLEY, a subject of the Belgian King, and resident of Brussels, Belgium, have invented certain new and useful Improvements in Filters, of which the following is a specification.

This invention relates to improvements in filters of the type that are usually designated as domestic filters, and provides a filter which may be used either as a drop-by-drop filter or as a pressure filter, and my invention consists of filtering members each made up of two or more sections of any suitable material that may be connected together by cement and through which water or liquid may percolate, slowly or drop-by-drop without auxiliary pressure and more rapidly when pressure is applied to the fluid to be filtered, two sections of the filtering members providing a chamber that is closed except as to the outlet opening for the discharge of filtered water, the filtering members being lenticular or double convex as to configuration both as to the cavity and the exterior surface. The uppermost section of the filtering body is saucer shaped, and the other section or sections are provided with a centrally disposed opening and are each of identical shape.

My invention consists more particularly in the construction and arrangement of parts which are assembled for co-operation and comprise a receptacle which is open at its upper part, the bottom having an aperture, and to such bottom there is secured so as to be removable therefrom an annular section of a filtering body, the same being associated with a closure that is saucer shaped the parts when joined by cement or otherwise providing a hollow lenticular or double convex filter of stone-like material through which water will percolate and be purified.

Several of the annular saucer shaped filtering units may be associated to form a column within a receptacle that is provided with a closure and an opening for filling the receptacle or for exerting upon the fluid in the receptacle pressure to add to the force of gravity and augment the percolation of the fluid contained in the receptacle through the hollow filtering units, as will be hereinafter set forth and claimed.

In the accompanying drawings which illustrate my invention;

Fig. 4 is a top plan view of the cover of the filter,

Fig. 5 is a partial section on line *a—a* of Fig. 4;

Fig. 6 is an elevation of the top part of the reservoir closed by means of its cover.

Fig. 7 is a detail sectional view showing the way in which two filtering bodies may be connected together, and Fig. 8 is a section of a filtering receptacle containing a vertical series of filtering bodies.

Figure 2:
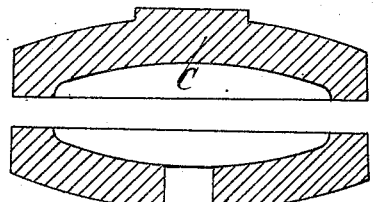
Figs. 2 and 3 show detail sections of the filtering body.
Figure 3:
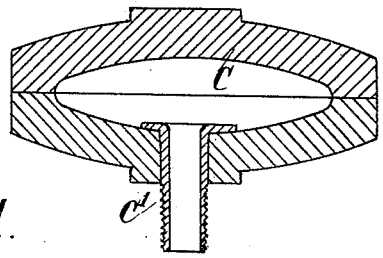
Figure 1:
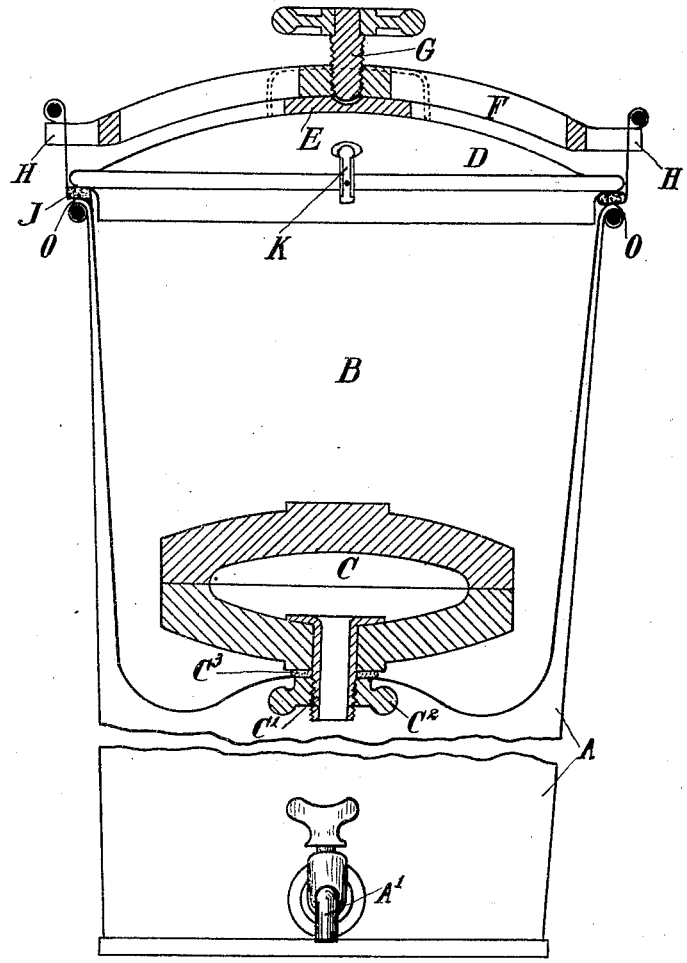
Fig. 1 is a sectional elevation of a domestic filter provided with a single filtering body.

The filter of my present invention is composed of an outer reservoir A (Fig. 1) and an inner receptacle B containing the water to be filtered and within which is arranged a filtering body C of saucer-shaped or lenticular shape, made of two parts connected together by means of suitable cement (Figs. 2 & 3) and in the center of the lower member or unit is an opening that is provided with a tube $C^1$ extending through the bottom of the inner receptacle or container B and secured thereto by means of a screw-nut $C^2$, a washer $C^3$ of India rubber or the like being provided to secure an air-tight connection. The bottom part of an outer vessel or container has a partition that provides therein a reservoir A, which is provided with a tap $A^1$ for the discharge of filtered water. The container B is suspended from the upper rim of the reservoir A by means of its annular shoulder O as shown in Fig. 1, and closed by means of a cover D, the central portion of which is strengthened by means of a disk E. Arranged on said cover is a yoke F having forked ends H, H and carrying a set-screw G, the forks H, H of said yoke engaging apertures M, M (Fig. 6) provided near the upper rim of the container B.

Between the rim of the cover D and the annular shoulder O of the container B I arrange an annular band or gasket of India rubber J. The cover D is provided with a nipple K for the inlet of compressed air, and with a stopper or other device L for the inlet of other gaseous bodies as for instance carbonic gas under pressure, or for the admission of carbonic acid capsules or other pressure producing an aerating substance.

My improved filter operates as follows:

The water to be filtered is poured into the container B and the latter is provided with its cover D, upon which the yoke F is then placed so that the forked ends H, H thereof engage the apertures M, M of the container B. Owing to the fact that the lower end of the set screw G engages a central notch of the disk E, the yoke F will be securely held in place.

Now if the set-screw G is screwed down, the rim of the cover D will be strongly pressed upon the rubber joint J, whereby the container B will be closed in an airtight way.

Now I may connect an air pump, for instance a bicycle pump, to the inlet K, to compress air as desired below the cover D, or introduce a suitable gaseous body through the inlet L, for the purpose of rapidly filtering and simultaneously aerating the water contained in the container B, filtered and aerated water being discharged from the tap $A^1$.

As shown in Fig. 7, two portions of filtering bodies may be connected at their bases by means of cement, and this connection may be reinforced by means of a metal tube section P held between two disks R by flanging the rim portion at each end of the tube section upon the corresponding washer R as shown. The filtering sections thus formed may be connected in series as shown in Fig. 8 for the purpose of providing a large filtering surface in a small space. Said series of filtering bodies C may be arranged within a container $B^1$, tightly closed by means of a cover $D^1$ capable of being connected to a water conduit. In this way I provide an improved pressure filter.

I wish it to be understood that the details of construction of the filters described and shown may be changed as desired without departing from the scope of the invention.

Having now fully described my said invention, what I claim and desire to secure by Letters Patent, is:

1. In a domestic filter, the combination with an outer reservoir and an inner container, of a filtering body of stone-like material of lenticular shape, arranged near the bottom of said container, a tube extending from the filtering body through the bottom of the container, a means engaging the tube to clamp the filtering body to the container, a cover closing the top of the latter, and means for pressing said cover upon the seat in order to make the container air-tight.

2. In a domestic filter, the combination with an outer reservoir and an inner container having an annular shoulder resting on the rim of said reservoir, of a hollow filtering body of stone-like material having a tube extending therefrom through the bottom of the container, a cover closing the top of the latter, an inlet for compressed air in said cover, a second inlet for gaseous bodies in said cover, and means for pressing the cover upon the annular shoulder of the container.

3. In a domestic filter, the combination with an outer reservoir and an inner container having an annular shoulder resting on the rim of said reservoir, of a filtering element to which is attached a tube that extends from the filtering element through the bottom of the container, a suitable cover closing the top of the latter, an inlet for compressed air in said cover, a second inlet for gaseous bodies in said cover, a yoke arranged upon the latter, forks at the opposite ends of said yoke intended to engage apertures near the upper rim of the container, and a central set-screw in said yoke bearing upon the cover of the container.

4. In a domestic filter, the combination of hollow stone-like lenticular filtering bodies, each of which is formed of two parts, connected together by means of cement, the lower section of the lower filtering body being provided with a tube for the discharge of filtered water, for the purpose set forth.

5. In a domestic filter, the combination with a water container, a cover closing the top of the latter, and a water inlet in said cover, of a vertical series of filtering bodies of elliptic or lenticular shape within said container, each body being formed of two parts cemented together, said bodies being successively cemented together at their bases and strengthened by means of tube sections and disks and a tube extending from the lowermost filtering body through the bottom of the container for the discharge of filtered water, substantially as set forth.

In testimony whereof I have hereunto set my hand in presence of two witnesses.

CHARLES HENRI TORLEY.

Witnesses:
C. O. NILS, Jr.,
F. Y. ZALWAY.